Aug. 12, 1930.                H. A. AFFEL                1,772,506
WAVE FILTER
Filed April 2, 1923     2 Sheets-Sheet 1
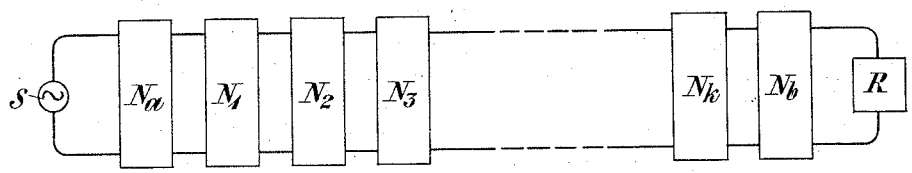
Fig. 1
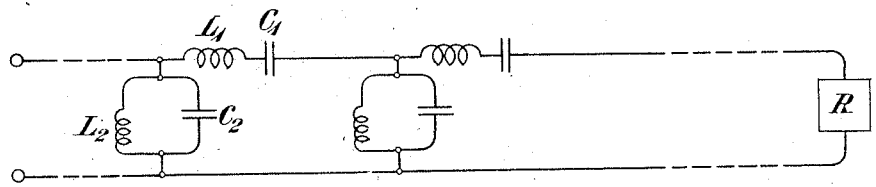
Fig. 2 - (PRIOR ART)
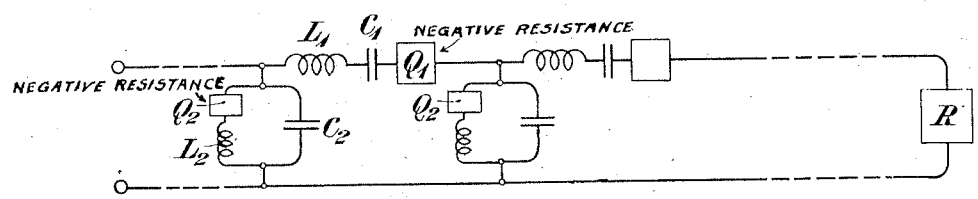
Fig. 3
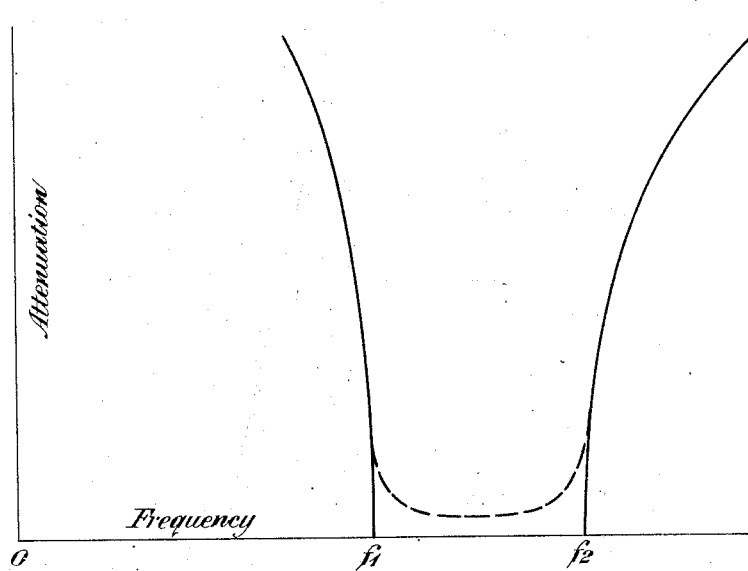
Fig. 4
INVENTOR
H. A. Affel
BY
ATTORNEY Aug. 12, 1930.   H. A. AFFEL   1,772,506
WAVE FILTER
Filed April 2, 1923    2 Sheets-Sheet 2

INVENTOR
H.A.Affel
BY
ATTORNEY

Patented Aug. 12, 1930

1,772,506

UNITED STATES PATENT OFFICE

HERMAN A. AFFEL, OF BROOKLYN, NEW YORK, ASSIGNOR TO AMERICAN TELEPHONE AND TELEGRAPH COMPANY, A CORPORATION OF NEW YORK

WAVE FILTER

Application filed April 2, 1923. Serial No. 629,471.

The principal object of my invention is to provide a new and improved electrical wave filter of the kind having similar recurrent sections. Another object of my invention is to provide such a filter with means to compensate for dissipation losses in the reactance elements. Another object is to produce a filter whose attenuation characteristic shall approximate closely to that of an ideal filter with no dissipation losses in its elements. These and other objects of my invention will be made apparent in the following specification, taken with the accompanying drawings, in which I have illustrated an embodiment of the invention by way of example, with the understanding that the scope of the invention is indicated in the appended claims.

Figure 5:
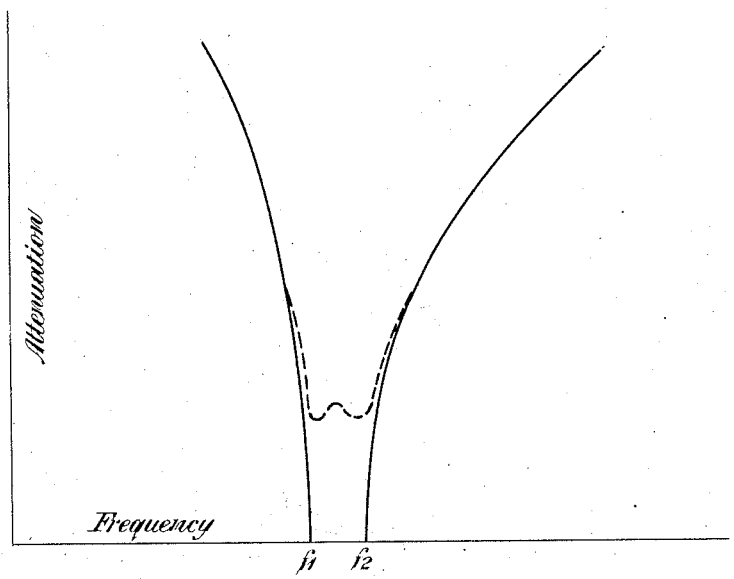
Figure 6:
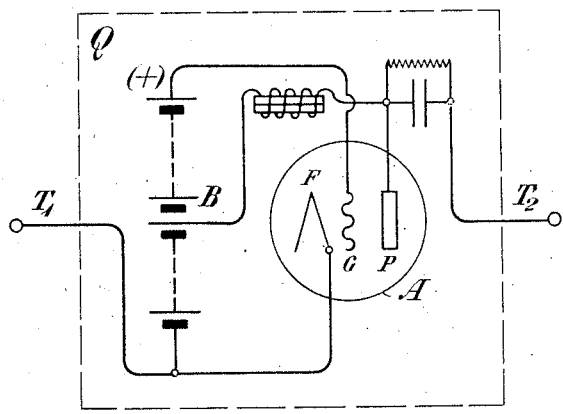
Figure 7:
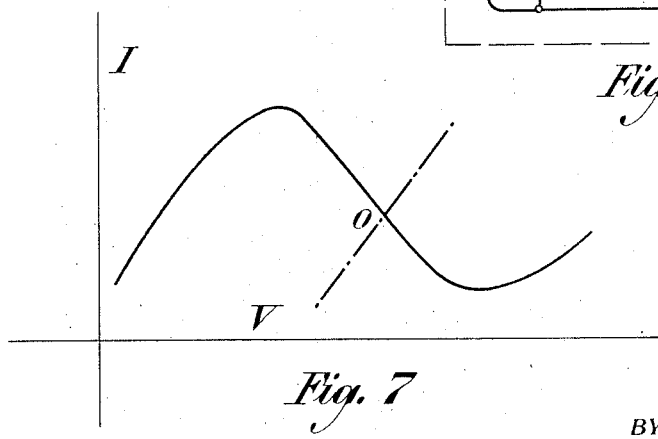

Referring to the drawings, Figure 1 is a diagram of a wave filter of the general type with which my invention is concerned. Fig. 2 is a diagram of a particular example, a band pass filter. Fig. 3 is a diagram of the same filter modified in accordance with my invention. Fig. 4 is an attenuation frequency characteristic for a band pass wave filter. Fig. 5 is an attenuation frequency characteristic for a narrow band pass wave filter. Fig. 6 is a diagram of a "negative resistance" element represented by the smybol Q in Fig. 3. Fig. 7 is a current voltage characteristic for the device of Fig. 6.

A filter belonging to the class affected by my invention consists of a sequence of like networks N with appropriate terminal networks $N_a$ and $N_b$, as shown in Fig. 1. When an alternating electromotive force is applied at one end, as from the source S, the current that reaches the receiving device R will accordingly be more or less attenuated. If the networks N are made up of pure reactance, without resistance, then for certain frequencies the current from the source S may be transmitted to the receiving device R without attenuation. In some cases, the networks N need not be exactly alike, but may differ according to certain conditions.

In Fig. 2, a specific example of a filter is shown, having successive series combinations each consisting of an inductance $L_1$ and a capacity $C_1$, in series, and alternately disposed shunt combinations each consisting of an inductance $L_2$ and a capacity $C_2$ in parallel. This is a band pass filter, and for a representative case the attenuation of the current received by the device R is given as a function of frequency by the curves of Fig. 4, subject to the condition that $L_1C_1 = L_2C_2$. If the inductances and capacities are assumed to be pure reactances, without dissipation losses, then between the two critical frequencies $f_1$ and $f_2$ the attenuation will be zero, but for frequencies less than $f_1$, or greater than $f_2$, the attenuation will be very considerable, as shown by the full line curves in Fig. 4.

On account of the practical impossibility of constructing inductances and capacities without dissipation losses, the actual attenuation characteristic in this band pass filter may take approximately the form shown in Fig. 4 by the dotted lines within the free transmitting range of frequencies.

In Fig. 3, I have shown this same band pass filter with "negative resistance" devices $Q_1$ in series with the respective inductances $L_1$ and other "negative resistances" $Q_2$ in series with the respective inductances $L_2$. These elements $Q_1$ and $Q_2$ are chosen and designed so that they neutralize the resistances of the respective coils $L_1$ and $L_2$. As is well known, the dissipation losses in a condenser can be made exceedingly small by careful design, so that it may be assumed that the dotted line curve in Fig. 4 is due almost entirely to the dissipation losses in the inductances. In any case the position of the negative resistances will insure to a large extent the annulment of the condenser losses also, and in the case of the shunt elements if it were desired to obtain more perfect action, an additional negative resistance element might be inserted directly in series with each condenser. By interposing the devices Q, the losses are almost exactly neutralized, and the attenuation in the range between $f_1$ and $f_2$ becomes almost zero. While the devices Q may also compensate the losses at other frequencies outside the range from $f_1$ to $f_2$, this is relatively unimportant; and it is not necessary to design the apparatus to secure such a result. The important thing is to neutralize the resistance at the frequency it is desired that the filter shall least attenuate.

The departure from the ideal for reactanceless elements in a filter, becomes more marked in a narrow band pass filter than in a wide band pass filter. This is shown by comparing Fig. 5 with Fig. 4, and at once it is apparent that my improvement may be of a special advantage for a narrow band pass filter having such an attenuation characteristic as is shown in Fig. 5.

A suitable "negative resistance" device is shown in Fig. 6 to take the place of $Q_1$ or $Q_2$ in Fig. 3. A brief description of its operation is as follows: The audion A has its grid highly positive, so that due to the electromotive force of the battery B there is a constant flow of electron current around the circuit GBF. Many of the electrons emitted by the filament F pass through the grid G and strike the plate P, giving rise to secondary electron emission from the plate P. If a slight increase of the voltage V in the circuit of the filament F and plate P is made by applying an external electromotive force, this causes the electrons from the filament F to strike the plate P with greater energy, and to dislodge a greater number of secondary electrons from the plate P so that the corresponding net electron current in the plate circuit becomes negative. On the other hand, if the voltage V is decreased, the electrons arriving at the plate P strike it with less energy, and the secondary electrons are in defect, so that the net electron current in the plate circuit accordingly becomes positive. The current-voltage curve for the plate circuit is shown by the full line in Fig. 7, and the plate P is maintained at such a positive potential with respect to the filament that for normal conditions when no voltage is applied to the terminals $T_1$ and $T_2$ the negative resistance device will be working on the midpoint of the negative slope part of the $I_p$—$E_p$ characteristic, i. e. point O.

Having given that the resistance characteristic of the inductance coil is the sloping dot-dash line shown in Fig. 7, the device of Fig. 6 is designed to have throughout its range of operation its resistance characteristic with the corresponding negative slope. Thus the resistance of the inductance coil is entirely neutralized, and the combination functions like an ideal filter with dissipationless inductances. Such dissipation losses as actually occur in the inductance coils are compensated by energy supplied in the device $Q_1$ or $Q_2$.

When a band pass filter such as shown in Fig. 2 is operating at a frequency within its pass range, a large component of current in a loop such as $L_2C_2$ will be in the same phase around the loop and of considerable magnitude. In this way the electromotive forces across the loop are in proper magnitude and phase to sustain the series currents through the filter from its input to its output. Thus it is that at a time when the attenuation is least or nil, the currents in (around) the loops such as $L_2C_2$ are of considerable magnitude. This fact will be relevant to the terminology employed in some of the appended claims.

I claim:

1. In an electrical wave filter of recurrent sections, each section comprising at least one reactance element, respective negative resistances associated therewith to compensate for the dissipation losses in said reactance elements.

2. In an electrical wave filter of recurrent sections, each section comprising at least one reactance element, respective negative resistances in series with said reactance elements to compensate for the dissipation losses in said reactance elements.

3. A wave filter system comprising in combination a plurality of filter sections each being constituted by at least one reactance, and a thermionic device incorporated in said filter system and associated with one of the said reactances in an intermediate section of said filter system, said device having a current-voltage characteristic of negative slope.

4. A wave filter system comprising in combination a plurality of filter sections, each section being constituted by at least one reactance, and thermionic devices respectively incorporated in at least two of said sections and associated respectively with the said reactances, said devices each having a current-voltage characteristic of negative slope.

5. A wave filter system comprising in combination a plurality of filter sections designed to attenuate certain frequencies and to transmit certain frequencies, each section comprising one or more reactances, and a thermionic device having its input and output circuits associated so that the device shall have a current-voltage characteristic of negative slope, said thermionic device being associated with one of said reactances whereby the efficiency of the corresponding filter section is materially increased.

6. A filter chain comprising a plurality of sections, each section having inductance and capacity reactances as constituent elements thereof, and means for neutralizing the resistance within each section at the frequency it is desired that the chain shall least attenuate.

7. A filter comprising a plurality of sections, each section being constituted by a plurality of impedance devices, sources of energy respectively individual to at least two of said sections, and means whereby the energy of said sources may be applied to said sections at the frequency it is desired that the filter shall least attenuate.

8. The combination with a wave filter having at least one reactance element in series and at least one reactance element in shunt, of at last one thermionic valve system associated respectively with a corresponding reactance element or elements so as to tend to neutralize the effective resistance of said wave filter.

9. The combination with a wave filter having at least one reactance element in series and at least one reactance element in shunt, of at last one thermionic valve system associated respectively with a shunt reactance element or elements and at least one thermionic valve system associated respectively with a series reactance element or elements.

10. In an electrical wave filter of recurrent sections each section comprising at least one reactance element, respective negative resistances associated therewith to compensate for the dissipation losses in said reactance elements, each said negative resistance being connected wholly within the corresponding filter section.

11. In an electrical wave filter of recurrent sections each section comprising at least one reactance element, respective negative resistances associated therewith to compensate for the dissipation losses in said reactance elements, the source for each such negative resistance being within the corresponding filter section.

12. In an electrical wave filter of recurrent sections each section comprising at least one reactance element, respective negative resistances in series with such reactance elements to compensate for the dissipation losses therein, each reactance element and its associated negative resistance being connected wholly in series between two points of the circuit system.

13. In an electrical wave filter of recurrent sections, each section comprising at least one reactance element lying between a pair of terminals, respective negative resistances associated with said reactance elements to compensate for the dissipation losses therein, each such reactance element and its respective associated negative resistance being wholly connected with the rest of the filter through the said two terminals.

14. In an electrical wave filter of recurrent sections, each section comprising at least one reactance element, energy-supplying means associated respectively with each reactance element to compensate for the dissipation losses therein.

15. In an electrical wave filter of recurrent sections, each section comprising at least one reactance element, energy-supplying means associated respectively with each reactance element to compensate for the dissipation losses therein, each said reactance element and the said associated means being connected with the rest of the filter wholly between a single pair of terminals.

In testimony whereof, I have signed my name to this specification this 30th day of March, 1923.

HERMAN A. AFFEL.